United States Patent
Macaluso (10) Patent No.: US 11,627,449 B2
(45) Date of Patent: Apr. 11, 2023

(54) SYSTEMS AND METHODS FOR MANAGING A VEHICLE'S ENERGY VIA A WIRELESS NETWORK

(71) Applicant: Anthony Macaluso, San Diego, CA (US)

(72) Inventor: Anthony Macaluso, San Diego, CA (US)

( * ) Notice: Subject to any disclaimer, the term of this patent is extended or adjusted under 35 U.S.C. 154(b) by 0 days.

(21) Appl. No.: 17/872,887

(22) Filed: Jul. 25, 2022

(65) Prior Publication Data

US 2022/0360959 A1 Nov. 10, 2022

Related U.S. Application Data

(63) Continuation of application No. 17/666,266, filed on Feb. 7, 2022, now Pat. No. 11,432,123, which is a
(Continued)

(51) Int. Cl.
*H04W 4/50* (2018.01)
*H04W 4/40* (2018.01)
(Continued)

(52) U.S. Cl.
CPC .............. *H04W 4/50* (2018.02); *G06F 8/65* (2013.01); *G06F 9/44505* (2013.01); *H04W 4/40* (2018.02)

(58) Field of Classification Search
CPC .. H04W 4/50; H04W 4/40; G06F 8/65; G06F 9/44505
See application file for complete search history.

(56) References Cited

U.S. PATENT DOCUMENTS 2,451,965 A 10/1948 Longenecker
2,660,443 A 11/1953 Miller
(Continued)

FOREIGN PATENT DOCUMENTS

CH 00372/21 4/2021
CN 107804326 1/2020
(Continued)

OTHER PUBLICATIONS

International Search Report and Written Opinion dated Nov. 5, 2020 in application No. PCT/US2020/036172.
(Continued)

*Primary Examiner* — Shean Tokuta
(74) *Attorney, Agent, or Firm* — Knobbe, Martens, Olson & Bear, LLP (57) ABSTRACT

The disclosure is directed to methods and systems for provisioning mobile electric vehicles with various operational settings data transmitted over the air. A vehicle or its components may operate according to operational settings corresponding to operational settings data included in the vehicle components. A server that is remote to the vehicle may comprise operational settings data and may transmit operational settings data to the vehicle. The server may transmit operational settings data automatically, such as on a periodic basis, in response to a request, such as from a user or from a vehicle component or anytime new or updated operational settings data are available for the vehicle or its components.

20 Claims, 7 Drawing Sheets

Related U.S. Application Data continuation-in-part of application No. 17/410,272, filed on Aug. 24, 2021, now Pat. No. 11,289,974, which is a continuation-in-part of application No. 17/332,824, filed on May 27, 2021, which is a continuation-in-part of application No. 17/141,518, filed on Jan. 5, 2021, now Pat. No. 11,133,729, which is a continuation-in-part of application No. 16/847,538, filed on Apr. 13, 2020.

(60) Provisional application No. 63/164,474, filed on Mar. 22, 2021, provisional application No. 63/140,805, filed on Jan. 23, 2021, provisional application No. 62/967,406, filed on Jan. 29, 2020, provisional application No. 62/883,523, filed on Aug. 6, 2019, provisional application No. 62/858,902, filed on Jun. 7, 2019.

(51) Int. Cl.
*G06F 8/65* (2018.01)
*G06F 9/445* (2018.01)

(56) References Cited

U.S. PATENT DOCUMENTS

| | | |
|---|---|---|
| 3,859,589 A | 1/1975 | Rush |
| 3,891,044 A | 6/1975 | Tiede |
| 3,943,370 A | 3/1976 | Watanabe |
| 3,961,678 A | 6/1976 | Hirano et al. |
| 3,978,936 A | 9/1976 | Schwartz |
| 4,214,160 A | 7/1980 | Fies et al. |
| 4,314,160 A | 2/1982 | Boodman et al. |
| 4,364,448 A | 12/1982 | Ikuma |
| 4,476,947 A | 10/1984 | Rynbrandt |
| 4,579,188 A | 4/1986 | Facer |
| 5,045,646 A | 9/1991 | Musachio |
| 5,078,227 A | 1/1992 | Becker |
| 5,086,857 A | 2/1992 | Dale |
| 5,105,776 A | 4/1992 | Tsuchiya |
| 5,316,101 A | 5/1994 | Gannon |
| 5,412,293 A | 5/1995 | Minezawa et al. |
| 5,491,390 A | 2/1996 | McGreen |
| 5,671,821 A | 9/1997 | McGreen |
| 5,680,907 A | 10/1997 | Weihe |
| 5,735,363 A | 4/1998 | Horovitz et al. |
| 5,767,663 A | 6/1998 | Lu |
| 5,921,334 A | 7/1999 | Al-Dokhi |
| 5,992,553 A | 11/1999 | Morrison |
| 6,065,557 A | 5/2000 | von Keyserling |
| 6,220,381 B1 | 4/2001 | Damron et al. |
| 6,390,215 B1 | 5/2002 | Kodama |
| 6,502,842 B2 | 1/2003 | Ko |
| 6,531,838 B2 | 3/2003 | Parks |
| 6,703,716 B2 | 3/2004 | Chiu |
| 6,717,280 B1 | 4/2004 | Bienville |
| 6,987,327 B1 | 1/2006 | Lucatero |
| 7,183,746 B1 | 2/2007 | Carter |
| 7,279,799 B1 | 10/2007 | McCauley |
| 7,514,803 B2 | 4/2009 | Wilks |
| 7,547,980 B2 | 6/2009 | Harrison |
| 7,753,010 B2 | 7/2010 | Rutledge |
| 7,913,783 B2 | 3/2011 | Elmaleh |
| 8,063,609 B2 | 11/2011 | Salasoo et al. |
| 8,206,263 B2 | 6/2012 | Tsuchikawa |
| 8,347,999 B2 | 1/2013 | Koelsch et al. |
| 8,573,346 B2 | 11/2013 | Duignan |
| 8,643,201 B2 | 2/2014 | Scott |
| 8,712,620 B2 | 4/2014 | Jackson |
| 8,723,344 B1 | 5/2014 | Dierickx |
| 8,872,368 B1 | 10/2014 | Kim et al. |
| 8,907,631 B1 | 12/2014 | Gurries |
| 9,236,761 B2 | 1/2016 | Strothmann |
| 9,242,698 B2 | 1/2016 | Frieden |
| 9,321,357 B2 | 4/2016 | Caldeira et al. |
| 9,376,971 B2* | 6/2016 | Luther .................. B61L 27/16 |
| 9,415,660 B2 | 8/2016 | Koelsch |
| 9,457,666 B2 | 10/2016 | Caldeira et al. |
| 9,981,553 B2 | 5/2018 | Schafer et al. |
| 10,077,056 B1 | 9/2018 | Fields et al. |
| 10,293,702 B2 | 5/2019 | Tu et al. |
| 10,513,180 B2 | 12/2019 | Quill |
| 10,787,089 B1 | 9/2020 | Macaluso |
| 10,797,564 B1 | 10/2020 | Griggs |
| 10,889,186 B2 | 1/2021 | Schutt |
| 10,903,679 B2 | 1/2021 | Schmalzrieth et al. |
| 11,007,878 B2 | 5/2021 | Kamino et al. |
| 11,072,254 B1 | 7/2021 | Macaluso |
| 11,117,481 B2 | 9/2021 | Macaluso |
| 11,130,415 B2 | 9/2021 | Macaluso |
| 11,133,729 B2 | 9/2021 | Macaluso |
| 11,222,750 B1 | 1/2022 | Macaluso |
| 11,289,974 B2 | 3/2022 | Macaluso |
| 11,299,054 B2 | 4/2022 | Macaluso |
| 11,318,856 B2 | 5/2022 | Macaluso |
| 11,322,311 B2 | 5/2022 | Macaluso |
| 11,472,306 B1 | 10/2022 | Macaluso |
| 11,548,399 B1 | 1/2023 | Macaluso |
| 11,577,606 B1 | 2/2023 | Macaluso |
| 2003/0071464 A1 | 4/2003 | Chiu |
| 2003/0139859 A1 | 7/2003 | Hanada |
| 2003/0184258 A1 | 10/2003 | VonderHaar |
| 2004/0012205 A1 | 1/2004 | Sua-An |
| 2005/0224263 A1 | 10/2005 | Vasilantone |
| 2006/0238258 A1 | 10/2006 | D'Amore |
| 2007/0075677 A1 | 4/2007 | Alvarez-Troncoso |
| 2007/0090702 A1 | 4/2007 | Schiller |
| 2007/0187957 A1 | 8/2007 | Harrison |
| 2008/0066979 A1 | 3/2008 | Carter |
| 2008/0223637 A1 | 9/2008 | Bartilson |
| 2008/0289890 A1 | 11/2008 | Stoltzfus |
| 2008/0297109 A1 | 12/2008 | Sandberg et al. |
| 2009/0033254 A1 | 2/2009 | Nagashima et al. |
| 2009/0079417 A1 | 3/2009 | Mort et al. |
| 2009/0145674 A1 | 6/2009 | Lee |
| 2009/0194998 A1 | 8/2009 | Lin |
| 2009/0230766 A1 | 9/2009 | Miyama |
| 2010/0019718 A1 | 1/2010 | Salasoo et al. |
| 2010/0117600 A1 | 5/2010 | Fazakas |
| 2010/0327600 A1 | 12/2010 | Koelsch |
| 2011/0106329 A1 | 5/2011 | Donnelly et al. |
| 2011/0163717 A1 | 7/2011 | Gale |
| 2011/0189507 A1 | 8/2011 | Reis |
| 2011/0200193 A1 | 8/2011 | Blitz et al. |
| 2011/0302078 A1* | 12/2011 | Failing .................. B60L 53/126 |
| | | 700/297 |
| 2011/0320074 A1 | 12/2011 | Erlston et al. |
| 2012/0012406 A1 | 1/2012 | Stoicoviciu |
| 2012/0237799 A1 | 9/2012 | Jiang |
| 2012/0309455 A1 | 12/2012 | Klose et al. |
| 2013/0067253 A1* | 3/2013 | Tsuda ................ H02J 13/00028 |
| | | 713/300 |
| 2013/0081886 A1 | 4/2013 | Jaberian |
| 2013/0096759 A1 | 4/2013 | Breton et al. |
| 2013/0119665 A1 | 5/2013 | Berbari |
| 2013/0257145 A1 | 10/2013 | Caldeira et al. |
| 2013/0266826 A1 | 10/2013 | Cowperthwaite |
| 2013/0332014 A1 | 12/2013 | Jackson |
| 2014/0091573 A1 | 4/2014 | Berbari |
| 2014/0132155 A1 | 5/2014 | Strothmann |
| 2014/0197780 A1 | 7/2014 | Imamura |
| 2014/0210398 A1 | 7/2014 | Powell |
| 2014/0244082 A1 | 8/2014 | Caron |
| 2014/0266004 A1 | 9/2014 | Andrews, Jr. |
| 2014/0266070 A1 | 9/2014 | Kurtzman |
| 2014/0285209 A1 | 9/2014 | Stichowski et al. |
| 2014/0368041 A1 | 12/2014 | Tu et al. |
| 2015/0008867 A1 | 1/2015 | Smychkovich |
| 2015/0089981 A1 | 4/2015 | Renfro |
| 2015/0197780 A1 | 7/2015 | Xu |
| 2015/0249362 A1 | 9/2015 | Bridgelall et al. |
| 2015/0260835 A1 | 9/2015 | Widmer et al. |
| 2015/0262154 A1 | 9/2015 | Wolfson |

(56) References Cited

U.S. PATENT DOCUMENTS

| | | |
|---|---|---|
| 2015/0343909 A1 | 12/2015 | Hikiri |
| 2016/0034952 A1 | 2/2016 | Parkin et al. |
| 2016/0089981 A1 | 3/2016 | Kodawara |
| 2016/0111907 A1 | 4/2016 | Lynds |
| 2016/0164373 A1 | 6/2016 | Liao et al. |
| 2016/0236578 A1 | 8/2016 | Liao |
| 2016/0243960 A1 | 8/2016 | Wood |
| 2016/0348788 A1 | 12/2016 | Lemmers |
| 2017/0063124 A1 | 3/2017 | Yu et al. |
| 2017/0117720 A1 | 4/2017 | Yung |
| 2017/0131999 A1* | 5/2017 | Dolby ................ G06F 8/61 |
| 2017/0176540 A1 | 6/2017 | Omi |
| 2017/0191459 A1 | 7/2017 | Zhang |
| 2017/0366017 A1 | 12/2017 | Clay et al. |
| 2018/0009329 A1 | 1/2018 | Tellez |
| 2018/0083469 A1 | 3/2018 | Bauer et al. |
| 2018/0154779 A1 | 6/2018 | Chol |
| 2018/0156144 A1 | 6/2018 | Inoue |
| 2018/0166750 A1 | 6/2018 | Chang |
| 2018/0215272 A1 | 8/2018 | Vitullo et al. |
| 2018/0254732 A1 | 9/2018 | Smolenaers |
| 2018/0312159 A1 | 11/2018 | Jent, II |
| 2019/0001804 A1 | 1/2019 | Wilhide |
| 2019/0004580 A1 | 1/2019 | Wilhide |
| 2019/0077254 A1 | 3/2019 | Stanley |
| 2019/0140245 A1 | 5/2019 | Mensch |
| 2019/0184843 A1 | 6/2019 | Jung et al. |
| 2019/0245375 A1 | 8/2019 | Schmalzrieth et al. |
| 2019/0329650 A1 | 10/2019 | Quill |
| 2019/0351895 A1 | 11/2019 | Ben-Ari |
| 2019/0351899 A1 | 11/2019 | Adam |
| 2019/0351948 A1 | 11/2019 | Derissaint |
| 2019/0359080 A1 | 11/2019 | Hellgren |
| 2020/0039379 A1 | 2/2020 | Schlosser |
| 2020/0094695 A1 | 3/2020 | Bowman |
| 2020/0207209 A1 | 7/2020 | Engel |
| 2020/0353839 A1* | 11/2020 | Tarchinski ............ B60L 58/12 |
| 2020/0381784 A1 | 12/2020 | Yamamoto |
| 2020/0384873 A1 | 12/2020 | Macaluso |
| 2021/0001737 A1 | 1/2021 | Hoess et al. |
| 2021/0046833 A1 | 2/2021 | Macaluso |
| 2021/0197687 A1 | 7/2021 | Searcy |
| 2021/0313121 A1 | 10/2021 | Macaluso |
| 2021/0334913 A1 | 10/2021 | Klein |
| 2022/0016941 A1 | 1/2022 | Sams |
| 2022/0028625 A1 | 1/2022 | Macaluso |
| 2022/0028627 A1 | 1/2022 | Macaluso |
| 2022/0052582 A1 | 2/2022 | Giannotta |
| 2022/0068570 A1 | 3/2022 | Macaluso |
| 2022/0111758 A1* | 4/2022 | Ijaz ................ H01M 10/425 |
| 2022/0167134 A1* | 5/2022 | Macaluso ............ B60K 1/04 |
| 2022/0209624 A1 | 6/2022 | Macaluso |
| 2022/0234458 A1 | 7/2022 | Macaluso |
| 2022/0301775 A1 | 9/2022 | Macaluso |
| 2022/0360141 A1 | 11/2022 | Macaluso |
| 2022/0360959 A1* | 11/2022 | Macaluso ............ B60K 1/00 |
| 2023/0026897 A1 | 1/2023 | Macaluso |

FOREIGN PATENT DOCUMENTS

| | | | | |
|---|---|---|---|---|
| CN | 113479111 A | * | 10/2021 | |
| CN | 108473063 B | * | 11/2021 | .......... B60L 11/1848 |
| EP | 1 253 698 | | 10/2002 | |
| JP | 2015027164 A | * | 2/2015 | |
| WO | WO 09/149769 | | 12/2009 | |
| WO | WO 10/133863 | | 11/2010 | |
| WO | WO-2011148531 A1 | * | 12/2011 | .............. B60L 53/14 |
| WO | WO 17/213079 | | 12/2017 | |
| WO | WO 19/219997 | | 11/2019 | |
| WO | WO 20/191367 | | 9/2020 | |
| WO | WO-2022015017 A1 | * | 1/2022 | |
| WO | WO 2022/219510 | | 10/2022 | |

OTHER PUBLICATIONS

International Search Report and Written Opinion dated May 2, 2022 in application No. PCT/US2022/011141.

International Search Report and Written Opinion dated May 19, 2022 in application No. PCT/US2022/011105.

International Search Report and Written Opinion dated May 3, 2022 in application No. PCT/US2022/011131.

* cited by examiner

SYSTEMS AND METHODS FOR MANAGING A VEHICLE'S ENERGY VIA A WIRELESS NETWORK

CROSS REFERENCE TO RELATED APPLICATIONS

This application is a continuation of U.S. patent application Ser. No. 17/666,266, filed Feb. 7, 2022, which is a continuation-in-part of U.S. patent application Ser. No. 17/410,272, filed Aug. 24, 2021, which claims benefit of priority to U.S. Provisional Patent Application No. 63/140,805, filed Jan. 23, 2021, and which is a continuation-in-part of U.S. patent application Ser. No. 17/332,824, filed May 27, 2021, which claims benefit of priority to U.S. Provisional Patent Application No. 63/164,474, filed Mar. 22, 2021, and which claims benefit of priority to U.S. Provisional Patent Application No. 63/140,805, filed Jan. 23, 2021, and which is a continuation-in-part of U.S. patent application Ser. No. 17/141,518, filed Jan. 5, 2021, which is a continuation-in-part of U.S. patent application Ser. No. 16/847,538, filed Apr. 13, 2020, which claims benefit of priority and is related to U.S. Provisional Patent Application No. 62/858,902, filed Jun. 7, 2019, U.S. Provisional Patent Application No. 62/883,523, filed Aug. 6, 2019, and U.S. Provisional Patent Application No. 62/967,406, filed Jan. 29, 2020. The disclosure of each of the aforementioned applications is incorporated herein in its entirety for all purposes.

FIELD OF THE DISCLOSURE

The present disclosure relates to over-the-air provisioning of electric vehicle operational settings.

BACKGROUND

Electric vehicles often include devices and components necessary or desirable for operation such as for the generation, management, storage and consumption of energy. Electric vehicle components and devices can include batteries and battery management systems. The devices and components of electric vehicles may operate in a variety of manners, according to a variety of settings, for example manufacturing settings. The operational settings of various electric vehicle devices and components are often static. Thus, changing, updating or altering an electric vehicle's operational settings can be challenging if not impossible, for example, requiring the purchase and installation of new, replacement and/or additional components in order to effectuate different operational settings. Furthermore, the operational settings of a vehicle's components may not allow the components to function with other components having different operational settings. This may limit the options of available components that may be used in a vehicle, for example making it difficult or impossible to replace an original vehicle battery with a battery from a different manufacturer. As such, systems and methods to allow for the simple, efficient and quick updating and/or altering of electric vehicle operational settings are desirable.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

The present disclosure provides a system for over-the-air provisioning of a vehicle's operational settings. The system may comprise: a server, remote to the vehicle, and comprising operational settings data. The server may be configured to: receive a request for operational settings data; and in response to receiving said request, transmit operational settings data to the vehicle; and one or more components of the vehicle configured to operate according to one or more operational settings. The one or more components may comprise: a transceiver configured to communicate wirelessly with the server to send requests to the server and to receive operational settings data from the server; a memory comprising executable software instructions, wherein the memory is configured to update the instructions in response to receiving operational settings data from the server; and a processor configured to execute the software instructions to cause the component to function according to the one or more operational settings corresponding to the operational settings data received from the server.

In some embodiments, the server may be configured to receive the request for operational settings data from a user or from the vehicle.

In some embodiments, the server is further configured to: receive a request from a user for operational settings options; and in response to receiving said request, transmit operational settings options to the user.

In some embodiments, the one or more components of the vehicle comprise one or more of an energy storage device, an energy generation system, a vehicle management system, a motor or a component interface device.

In some embodiments, the server is configured to, in response to receiving, at the server, the request for operational settings data, determine whether operational settings data are available.

In some embodiments, the server is configured to, in response to receiving, at the server, the request for operational settings data, determine a status of current operational settings data of the vehicle.

In some embodiments, the system may further comprise a third-party server remote to the vehicle and remote to the server. The third-party server may comprise operational settings data and wherein the server is configured to communicate wirelessly with the third-party server to send and receive data.

In some embodiments, the server is configured to record download event information to a history log.

The present disclosure provides a method for over-the-air provisioning of a vehicle's operational settings. The method may comprise: receiving, at a server remote to the vehicle, a request for operational settings data; in response to receiving said request, transmitting operational settings data from the server to the vehicle; receiving, at a component of the vehicle, the operational settings data; storing, in a memory of the component, the operational settings data, wherein the operational settings data comprise executable software instructions; and executing, at a processor of the component, the executable software instructions of the operational settings data to cause the component to operate according to an operational setting corresponding to the operational settings data.

In some implementations, receiving the request for operational settings data at the server comprises receiving the request from the vehicle or a user.

In some implementations, the method can further comprise receiving, at the server, a first request from a user for operational settings options; and in response to receiving said first request, transmitting to the user, operational settings options from the server to the user.

In some implementations, the method can further comprise in response to receiving, at the server, the request for operational settings data, determining whether operational settings data are available.

In some implementations, the method can further comprise in response to receiving, at the server, the request for operational settings data, determining a status of current operational settings data of the vehicle.

In some implementations, determining the status of the operational settings data of the vehicle comprises: querying the vehicle for data relating to its current operational settings data; determining operational settings data that are accessible to the server and available for the vehicle; and comparing the operational settings data accessible to the server with the current operational settings data of the vehicle.

In some implementations, determining the status of the operational settings data of the vehicle comprises: accessing a history log of download event information to determine the current operational settings data of the vehicle; determining operational settings data that are accessible to the server and available for the vehicle; and comparing the operational settings data accessible to the server with the current operational settings data of the vehicle.

The present disclosure provides a method for over-the-air provisioning of a vehicle's operational settings. The method can comprise: detecting, by a first component of the vehicle, a second component of the vehicle; determining, by the first component, an operational incompatibility between the first and second components; transmitting, by the first component, a request for operational settings data to a server remote to the vehicle; receiving, from the server, operational settings data at the first component; updating executable software instructions of the first component according to the operational settings data; and executing the updated executable software instructions to cause the first component to operate according to an operational setting corresponding to the operational settings data to render the first component compatible with the second component.

In some implementations, the first component of the vehicle comprises one or more of an energy storage device, an energy generation system, a vehicle management system, a motor or a component interface device.

In some implementations, the method can further comprise in response to receiving, at the server, the request for operational settings data, determining, by the server, whether operational settings data are available.

In some implementations, the method can further comprise in response to receiving, at the server, the request for operational settings data, determining, by the server, a status of current operational settings data of the vehicle.

In some implementations, determining the status of the operational settings data of the vehicle comprises: querying the vehicle for data relating to its current operational settings data; determining operational settings data that are accessible to the server and available for the vehicle; and comparing the operational settings data accessible to the server with the current operational settings data of the vehicle.

DETAILED DESCRIPTION

Overview

Example systems and methods for over-the-air provisioning of a vehicle's operational settings are described herein. A system for over-the-air provisioning of a vehicle's operational settings can include a server remote to the vehicle which can include or have access to operational settings data. The server can transmit (e.g., wirelessly) the operational settings data to the vehicle. Operational settings data can affect how a vehicle or its components function.

Various methods exist for transmitting operational settings data to a vehicle (e.g., from a remote server). Operational settings data can be transmitted to the vehicle in response to a request (e.g., from the vehicle or its components, or from a user), automatically such as on a periodic basis, anytime operational settings data (updated or new) are available for the vehicle or anytime updated or new operational settings data are required or desired for improving performance of a vehicle or its components.

Various example systems and methods for over-the-air provisioning of an electric vehicle's operational settings are described herein, for example, with reference to the figures. The various systems, methods and their implementations are given as examples and are not meant to be limiting of the present disclosure.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Vehicle Components: Any of the components of a vehicle such as an energy storage device (e.g., battery, capacitor), an energy generation system (e.g., a generator), a motor, a vehicle management system, a component interface device, etc. The vehicle components may operate according to operational settings and may be provisioned over-the-air.

Operational Settings: The various settings according to which a vehicle or its components may operate.

(Operational) Settings Data: Data for provisioning the operational functionality of a vehicle or its components. Settings data may include executable software instructions or files including the same.

Operational Settings Options: The various operational settings that may be available to a vehicle for download and which a user may review and select.

Operational Settings Server (OSS): A server, remote to a vehicle, that may communicate with the vehicle. The OSS may be configured to store various operational setting data that can be downloaded to a vehicle.

User: A person or entity that may be associated with a vehicle and may communicate with the OSS for requesting operational settings data to be downloaded to the vehicle.

Vehicle Management System: A system or device for controlling or managing the operational functionality of a vehicle or its components. The vehicle management system may communicate with the OSS and may manage the provisioning of the vehicle such as requesting, downloading, storing operational settings data. The vehicle management system may comprise and/or may be referred to herein as a battery management system. The vehicle management system may include a processor or other similar computing device.

Component Interface Device: A device or system electrically coupled to two or more components of a vehicle that may act as an interface between the components to allow the components to operate with each other in the vehicle.

Example Systems for Over-the-Air Provisioning

Figure 1A:
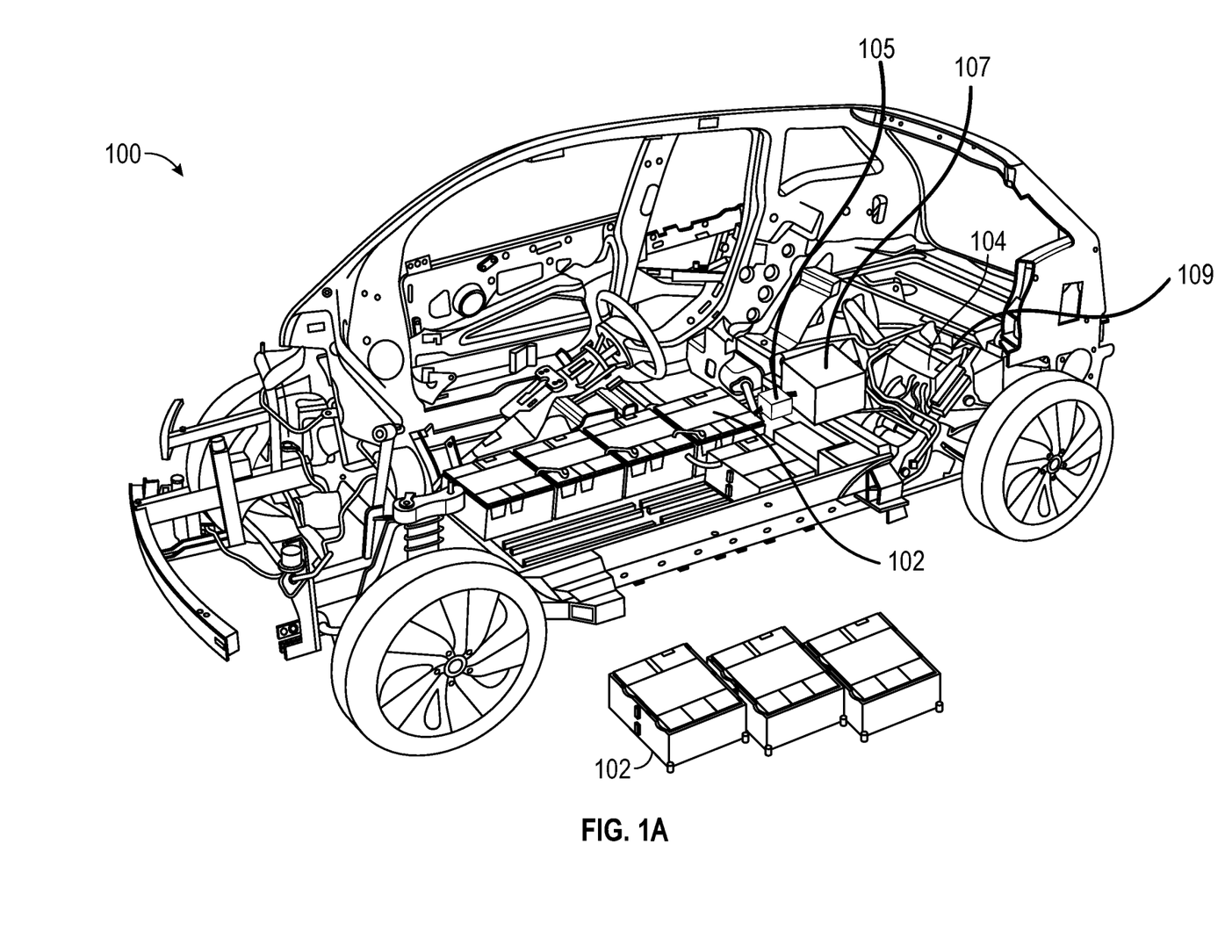
FIG. 1A illustrates an example vehicle such as an electric vehicle that may be provisioned according to over-the-air systems and methods described herein.

FIG. 1A illustrates an example vehicle 100 such as an electric vehicle that may be provisioned according to over-the-air systems and methods described herein. As shown, the vehicle 100 can include various components such as a motor 104, a generation system 109 (e.g., a generator), a vehicle management system 107 (such as a battery management system), a component interface device 105, one or more energy storage devices 102 (e.g., batteries, deep-cycle batteries, battery fields, capacitors, ultracapacitors, hypercapacitors) and the like. As shown, the energy storage devices 102 may be added to, or removed from, the vehicle, for example in a modular fashion. In some embodiments, energy storage devices 102 may be replaced with energy storage devices of a different type of device (such as switching a battery to a capacitor) or to energy storage devices of the same type but of a different make or model (such as switching a battery from one manufacturer to a battery of a different manufacturer). In some embodiments, energy storage devices 102 used in a vehicle at one time may include devices of different types or makes or models. Some or all of the various components may be provisioned (e.g., over-the-air) as described herein. FIG. 1A is provided as an example and is not intended to be limiting. In some embodiments, the components may be arranged in a different manner (e.g., different locations in the vehicle) than what is shown in FIG. 1A. In some embodiments, the vehicle may include more or less components or different types of components than what is shown in FIG. 1A.

Figure 1B:
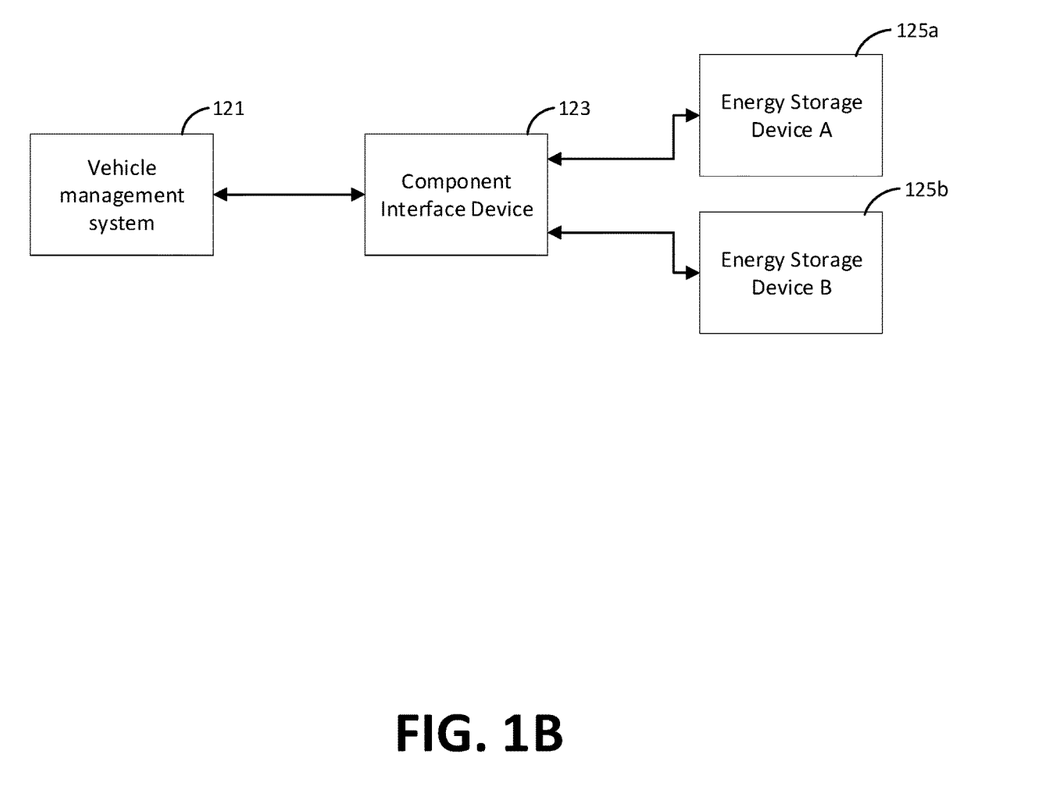
FIG. 1B is a block diagram illustrating an example embodiment of a component interface device.

FIG. 1B is a block diagram illustrating an example embodiment of various components of a vehicle including a vehicle management system 121, a component interface device 123 and one or more energy storage devices 125a, 125b.

The vehicle management system 121 may be electrically coupled to the component interface device 123 which in turn may be electrically coupled to one or more energy storage devices 125a, 125b. The electrical coupling between the components, as described, may facilitate the communication of data between the components which may affect how the components function and function together. In some embodiments, the components may be electrically coupled via wires. In some embodiments, the components may be electrically coupled wirelessly.

The vehicle management system 121 may control operation of the one or more energy storage devices 125a, 125b. For example, the vehicle managements system 121 may determine the conditions under which the energy storage device 125 is charged, discharged, the rate of charging or discharging, the maximum or minimum charge held by the energy storage device, and may coordinate charging and discharging between multiple energy storage devices 125.

The vehicle management system 121 and the energy storage devices 125a, 125b may each include parameters, for example, operational settings data included on the component that may be executed by a computing device to control operation of the respective components. The operational settings included on each respective component (vehicle management system 121, energy storage device 125) may have been encoded during manufacturing (e.g., manufacturer's settings) or may have been configured during an initial configuration of the component. In some embodiments, the operational settings of the vehicle management system 121 or energy storage device 125 may be static and it may be impossible or difficult to change the operational settings of said components. In some embodiments, the operational settings of the vehicle management system 121 or energy storage device 125 may be quickly updated, for example via over-the-air provisioning as described herein. In some embodiments, the vehicle management system 121 or energy storage device 125 may only operate with certain other components (e.g., types, makes, models) based on the configuration of the operational settings. For example, the operational settings of a component may be required to be compatible with operational settings of other components for the components to function together.

A component interface device 123 may facilitate the interaction between a vehicle management system 121 and an energy storage device 125, for example in embodiments where the operational settings of the vehicle management system 121 or energy storage device 125 are static and/or are not initially configured for compatible functionality with one another.

The component interface device 123 may include parameters, for example, operational settings data included on the component interface device 123 that may be executed by a computing device to control operation of the component interface device 123.

The component interface device 123 may be configured to detect an energy storage device 125 as well as a type, make or model of the energy storage device. For example, the component interface device 123 may be configured to determine whether the energy storage device is a battery or a capacitor as well as other characteristics of the energy storage device (e.g., make or model). The component interface device 123 may be configured to detect and determine characteristics of the vehicle management system 123.

The component interface device 123 may be configured to determine (e.g., type or characteristics of) the operational settings data included on the energy storage device 125 or the vehicle management system 121, for example by parsing the operational settings data of the other components or detecting an identifier of the operational settings data such as an operational settings data tag or header included in the operational settings data and containing information relating to the characteristics of the operational settings data. The component interface device 123 may be configured to facilitate an operational compatibility between the vehicle management system 121 and energy storage device 125 for example in embodiments where the operational settings data of the vehicle management system 121 and energy storage device 125 would not otherwise be compatible.

As an example of facilitating an operational compatibility, the component interface device 123 may receive an electrical communication (e.g., via wires or wirelessly) from the vehicle management system 121, for example, including data relating to instructions to control an operation of the energy storage device 125. The component interface device 123 may determine (or may have previously determined) the operational settings data of the energy storage device 125. If the operational settings data of the energy storage device 125 is not compatible with the operational settings data of the vehicle management system 121 (e.g., such that the energy storage device 125 would not "understand" the instructions and/or data communicated from the vehicle management system 121), the component interface device 123 may "translate" the data communicated from the vehicle management system 121 to a form that is compatible with the operational settings data of the energy storage device 125, for example, by generating new data and/or altering the data received from the vehicle management system 121. The component interface device 123 may be configured to perform similar operations of translating data communicated from the energy storage device 125 to the vehicle management system 121.

The component interface device 123 may control the interacting between two components based on operational settings data of the component interface device 123. For example, the component interface device 123 may interface a vehicle management system 121 with a certain energy storage device 125a according a first operational settings data of the component interface device 123. A second energy storage device 125b may be added to the vehicle which may replace or supplement energy storage device 125b. The component interface device 123 may not be configured according to the first operational settings data to facilitate operational compatibility between the vehicle management system 121 and the energy storage device 125b. However, the component interface device 123 may be provisioned (e.g., over-the-air as described herein) with second operational settings data which may configure the component interface device 123 to facilitate operational compatibility between the vehicle management system 121 and the energy storage device 125b.

FIG. 1B is provided as an example and is not intended to be limiting. In some embodiments, the component interface device 123 may be configured, e.g., according to one or more sets of operational settings data, to facilitate operational compatibility between the vehicle management system 121 and any number of energy storage devices 125, such as one energy storage device 125 or more than two energy storage devices 125. In some embodiments, the component interface device 123 may be configured, e.g., according to one or more sets of operational settings data, to facilitate operational compatibility between the vehicle management system 121 and a variety of different types, makes and/or models of energy storage devices 125.

The example components discussed above with reference to FIG. 1B are not intended to be limiting. In some embodiments, the component interface device 123 may facilitate an operational compatibility between any two components such as, for example, between any combination of the following components: energy storage devices, energy generation systems, motors, vehicle management systems, other component interface devices, and the like.

Figure 2:
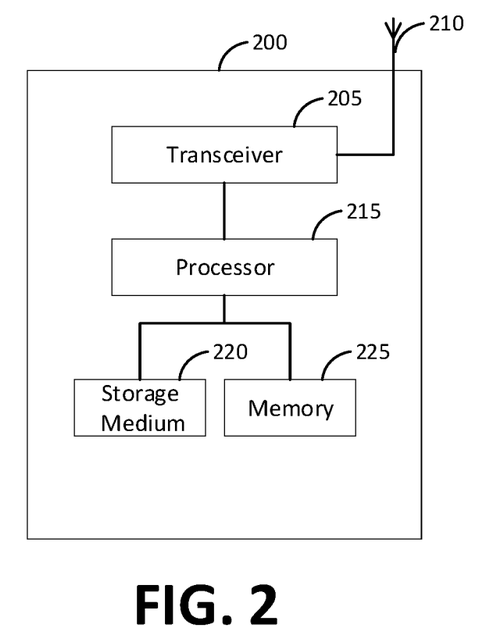
FIG. 2 is a block diagram illustrating an example vehicle component that may be used in a vehicle for over-the-air-provisioning of the vehicle.

FIG. 2 is a block diagram illustrating an example vehicle component 200 of a vehicle that may be provisioned over-the-air. The vehicle component 200 may comprise any of the example components described herein, for example with reference to FIGS. 1A-1B, such as an energy storage device, a generation system, a motor, a vehicle management system or a component interface device. In some embodiments, the vehicle component 200 may comprise a vehicle management system. In some embodiments, the vehicle management system may control how other components of the vehicle operate, for example, according to executable software instructions on a processor of the vehicle management system. The vehicle management system can receive operational settings data to update, replace, edit and/or revise the executable software instructions to thereby alter its own operation and/or the operation of any of the other components in the vehicle.

In some embodiments, the vehicle component 200 may comprise a component interface device. In some embodiments, the component interface device may facilitate an operational compatibility between two or more components, for example as described with reference to FIG. 1B. The component interface device can receive operational settings data to update, replace, edit and/or revise executable software instructions included thereon to thereby alter its own operation, for example, to configure the component interface device to facilitate operational compatibility between new, additional or replacement components.

In some embodiments, a vehicle may comprise multiple components that include structural and/or operational features similar to those show in example vehicle component 200. For example, a battery of a vehicle as well as a vehicle management system of a vehicle as well as a component interface device may all include structural and/or operational features for communicating with a server and receiving and storing operational setting data as described herein. In some embodiments, components of a vehicle with structural and/or operational features for over-the-air provisioning may each communicate with a server independently from all other components of the vehicle or may communicate in a coordinated manner such that their communication is organized or controlled, for example, by the vehicle managements system. In some embodiments, components of a vehicle with structural and/or operational features for over-the-air provisioning may each communicate with a unique server or with the same server.

The vehicle component 200 can include a transceiver 205, a wireless communicator 210, a processor 215, a storage medium 220 and a memory 225. The transceiver 205 may be connected to the wireless communicator 210 which can comprise an antenna or other similar device for facilitating communicating data to and from a remote server (e.g., OSS described herein). As used herein, phrases referring to communicating with the vehicle (such as sending requests from a vehicle to a server or receiving settings data from a server) may comprise communicating with a component of the vehicle such as example component 200.

The transceiver 205 can be connected to a processor 215 that can control the operation of the vehicle component 200, including the operation of the transceiver 205. The storage medium 220, which may be removable, read-only, or read/write media and may be magnetic-based, optical-based, semiconductor-based media, or a combination of these, may store vehicle operating system software for the vehicle component 200 and may also store at least some settings data. The memory 225 may store additional, information, such as applications that may be loaded into the vehicle component 200. In addition, some or all of the settings data for the vehicle component 200 may be stored in the memory 225. Both the memory 225 and the storage medium 220 can be connected to the processor 215. The processor 215 may operate in accordance with executable software, applications, or other instructions stored in the memory 225 and/or the storage medium 220.

In some implementations, memory 225 and/or storage medium 220 may store pre-configured instructions for executing operational settings in a vehicle. In some implementations, the memory 225 and/or storage medium 220 may store instructions for executing an application or program to allow a user to interact with the component 200, for example to request or select operational settings. In some implementations, the memory 225 and/or storage medium 220 may store instructions for communicating with a remote server, for example to retrieve settings data therefrom or to send requests thereto.

Figure 3:
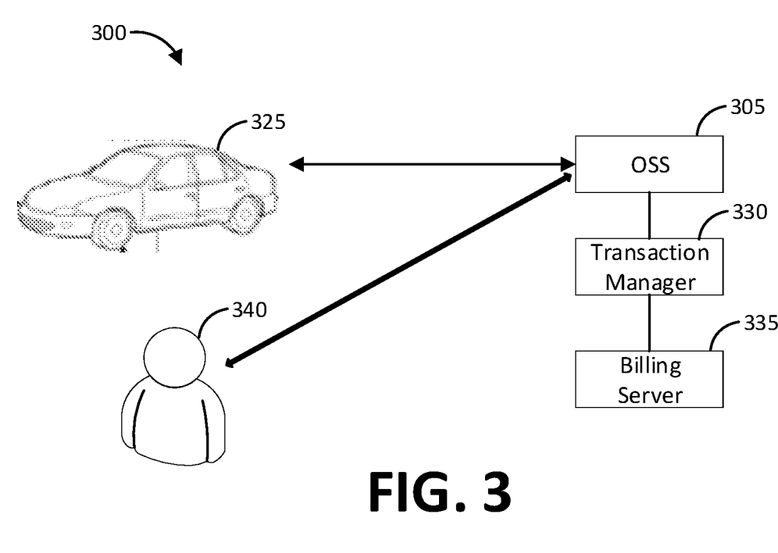
FIG. 3 is a block diagram illustrating an example system for over-the-air provisioning of a vehicle's operational settings.

FIG. 3 is a block diagram illustrating an example system 300 for over-the-air provisioning of a vehicle's operational settings. A vehicle 325 (and/or user 340) and operational settings server (OSS) 305 may be in communication with each other, for example, via a wireless communications path which may allow geographically dispersed devices, systems, databases, servers and the like to connect (e.g., wirelessly) and to communicate (e.g., transfer data) with each other. For example, in some embodiments, the vehicle 325 (and/or user 340) and OSS 305 may communicate with each other via a wireless network which may comprise a local area network (LAN), a personal area network (PAN) a metropolitan area network (MAN), a wide area network (WAN) or the like. In some embodiments, the vehicle 325 (and/or user 340) and OSS 305 may communicate with each other via radio waves transmitted via antennas, satellites, Bluetooth technology or the like. In some embodiments, the vehicle 325 (and/or user 340) and OSS 305 may communicate with each other using any combination of the foregoing examples.

The vehicle 325 (and/or user 340) may communicate data (e.g., via a wireless communication path) to the OSS 305. For example, the vehicle 325 (and/or user 340) may send requests to the OSS 305 for operational settings data. The requests can include general requests for operational settings data and/or requests for specific operational settings data. The user 340 may send requests to the OSS 305 for operational settings options. The vehicle 325 (and/or user 340) may send information relating to operational settings data currently included in the vehicle to inform the OSS 305 of the operational settings data possessed by the vehicle such as which settings data or which versions of settings data are possessed by the vehicle.

The OSS 305 may communicate data (e.g., via a wireless communication path) to the vehicle 325 (and/or user 340). For example, the OSS 305 may send operational settings data to the vehicle 325. The OSS 305 may send data relating to operational settings options to a user 340 for example to provide information to the user 340 relating to which operational settings are available for download to the vehicle 325 so that the user 340 may select which operational settings to download to the vehicle 325.

Operational settings data may be stored on an operational settings server (OSS) 305 and transmitted (e.g., via wireless communication) to the vehicle 325. When operational settings are downloaded from the OSS 305, the OSS 305 can collect download event information and send it to a transaction manager 330. The download event information can include the time of the download, the settings data that was downloaded, the reason for the download, the vehicle and/or user associated with the download etc. The transaction manager 330 can combine the download event information with other information, such as operational settings pricing structure and developer data for the downloaded operational settings, to produce usage records. The transaction manager 330 can send the usage records to a billing server 335, which may perform billing services, such as generating invoices. In addition, the billing server 335 may allow an operational settings developer, and/or a third party associated with the OSS 305 to run a report and find out how many users have downloaded and/or are subscribing to a particular service offering or operational setting.

The OSS 305 may be associated with a particular operator or with a third party. In some implementations, the OSS 305 may be operated by a third party that offers the operational settings for a variety of vehicle and/or vehicle component types, for example according to different manufacturers according to their respective various requirements and specifications. In some implementations, the OSS 305 may be operated by multiple third parties that each provide unique operational settings, for example each according to a different vehicle type and/or vehicle component or component type.

In some embodiments, the OSS 305 may offer passthrough access to third party operational settings data, such that the operational settings are stored and managed on a server associated with the third party. In some embodiments, most or all of the available applications may be stored and managed on the OSS 305. The operator of the OSS 305 may have agreements with the third parties to offer the operational settings and to provide for payment to the third parties.

Example Operational Settings of an Electric Vehicle

A vehicle or its components may operate according to various operational settings.

Operational settings data (e.g., executable software instructions) may be downloaded to a vehicle component and may affect the how the component functions or operates. Examples are provided of various operational settings that may pertain to the various components of a vehicle.

Operational settings data may affect how an energy storage device, such as a battery of a vehicle operates. For example, operational settings data can affect the rate at which a battery charges or discharges, the maximum or minimum voltage (e.g., energy charge) that a battery may hold, whether a battery is charged or not charged, the conditions under which a battery is charged, when to start or stop charging a battery and the like. Operational settings data can affect where energy is stored, for example in vehicles including more than one energy storage device such as multiple batteries, multiple capacitors or batteries and capacitors. For example, according to one operational setting a vehicle may store energy in a first battery before storing energy in a second battery and vice versa according to a different operational setting. As another example, according to one operational setting, a vehicle may store energy in a capacitor before storing energy in a battery and vice versa according to a different operational setting. As another example, according to one operational setting, one energy storage device (e.g., capacitor) may receive and store energy until a certain threshold is reached that is defined by the operational setting before discharging energy into another energy storage device.

Operational settings data may affect how an energy generation system of a vehicle operates. For example, operational settings data can affect a rate at which an energy generation system generates energy, when it generates energy, when it starts or stops generating energy, where to store or transfer generated energy and the like. For example, according to one operational setting, an energy generation system may generate energy only when the vehicle is accelerating (positive acceleration or negative acceleration) and according to another operational setting, an energy generation system may generate energy only when the vehicle is experiencing constant velocity and zero acceleration.

Operational settings data may affect how a motor of a vehicle operates. For example, operational settings data can affect a rate at which the motor consumes energy, the sources from which the motor draws energy such as from a battery or a capacitor, and the like. As an example, according to one operational setting, the motor may draw energy at a certain rate from a first energy storage device under certain conditions and may draw energy at a certain rate from a second energy storage device under different conditions.

Operational settings data may affect how a vehicle management system of a vehicle operates. For example, operational settings data can affect how a vehicle management system interacts with and/or controls other components of a vehicle. As an example, according to one operational setting, the vehicle management system may manage a vehicle's energy (e.g., generation, storage, consumption) in one way and in a different way according to a different operational setting.

Operational settings data may affect operational compatibility between various components of a vehicle. For example, operational settings data may configure one component to interface (e.g., electrically couple and communicate) with another component. For example, operational settings data may allow a vehicle management system to interface with any of the other components. As an example, a new component that is installed or included in the vehicle may operate according to manufacturer's specifications and may as a result not function properly (or at all) with other components of the vehicle. The new component or other components of the vehicle may download operational settings data to allow the new component to interface with the other components of the vehicle.

In certain embodiments, one or all of the components of a vehicle may not be configured for over-the-air provisioning. In such embodiments, a component interface device may advantageously be used to facilitate operational compatibility between components, for example rather than directly provisioning the components themselves. For example, a component interface device may be installed in a vehicle and may be provisioned (e.g., over-the-air) with various operational settings data as required or desired to configure the component interface device to integrate and operate with other components of the vehicle and to facilitate operational compatibility between any of the other components in the vehicle such as between a vehicle management system and an energy storage device.

In some embodiments, a component interface device may be used when the other components of the vehicle are configured for over-the-air provisioning.

Advantageously, provisioning vehicle components may reduce the need for costly, technical or otherwise challenging servicing of the vehicle (e.g., mechanical or electrical fixes) to allow for a new component to integrate in a vehicle such as when a new battery is installed. Provisioning may also allow for components to be installed in a vehicle that would otherwise not be able to integrate and function in said vehicle. For example, by provisioning vehicle components with operational settings data, components from various manufacturers that would otherwise not be capable of functioning together, may be integrated into a vehicle and operate according to a desired manner.

Operational settings data may affect functionality of other computer-based components of a vehicle, such as navigation, stereo, driver assistance systems and the like. Operational settings data may comprise software patches or fixes such as for disabled vehicle components or vehicle components that are not functioning correctly.

Example Methods for Over-the-Air Provisioning

FIGS. 4-7 are flowcharts illustrating example processes for over-the-air provisioning of a vehicle's operational settings. Various methods may exist for the over-the-air provisioning of a vehicle's operational settings. For example, the operational settings may be provisioned automatically on a periodic basis, the operational settings may be provisioned in response to a request (such as from a user or vehicle), or in response to a detected new vehicle component or in response to detected altered operation of the vehicle or in response to some other input. As further examples, a vehicle's operational settings may be provisioned during an initial configuration of the vehicle and/or the vehicle's operational settings or may be provisioned when new operational settings are available. The example processes shown in FIGS. 4-7 are provided as example and are not intended to be limiting. In some embodiments, the flowcharts may include more or less blocks than what are shown in the FIGS.

Figure 4:
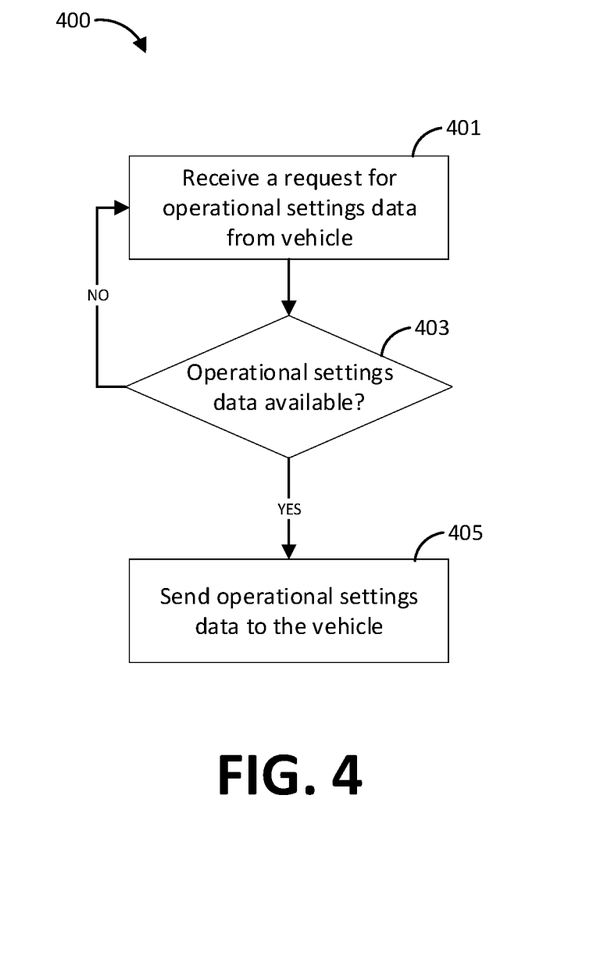
FIGS. 4-7 are flowcharts illustrating example processes for over-the-air provisioning of a vehicle's operational settings.

FIG. 4 is a flowchart illustrating an example 400 process for over-the-air provisioning of a vehicle's operational settings. Example process 400, or any portion thereof, may be implemented on a server that may be remote to the vehicle, such as OSS described with reference to FIG. 3. At block 401, the server may receive a request for operational settings data from the vehicle. In some embodiments, the request may be a general request, for example a request for all available operational settings data or the request may be a specific request for specific operational settings data. In some embodiments, the vehicle may transmit the request upon an initial configuration of the vehicle or its various components. In some embodiments, the vehicle may transmit the request automatically on a periodic basis, for example, to continually check if the vehicle has received the most up-to-date operational settings. In some embodiments, at block 401, the server may receive a request from a user. In some embodiments, the request may be received via wireless communication. In some embodiments, the request may be communicated to the server from a component of the vehicle such as a vehicle management system of the vehicle or a component interface device of the vehicle.

At block 403, the server may check if operational settings data is available. For example, the vehicle may have requested any available updated settings data and the server, at block 403, may check if any updated settings data is available or if the vehicle has the most updated settings data already. If settings data is available, the server may proceed to block 405 and if not, may proceed to block 401.

At block 405, the server may send operational settings data to the vehicle or component thereof, such as a vehicle management system or a component interface device. The settings data may be sent to the vehicle over a wireless communications path. In some embodiments, the operational settings data sent at block 405 may include all settings data available on the server or a subset thereof, such as specific operational settings data in response to a request for specific operational settings data.

Figure 5:
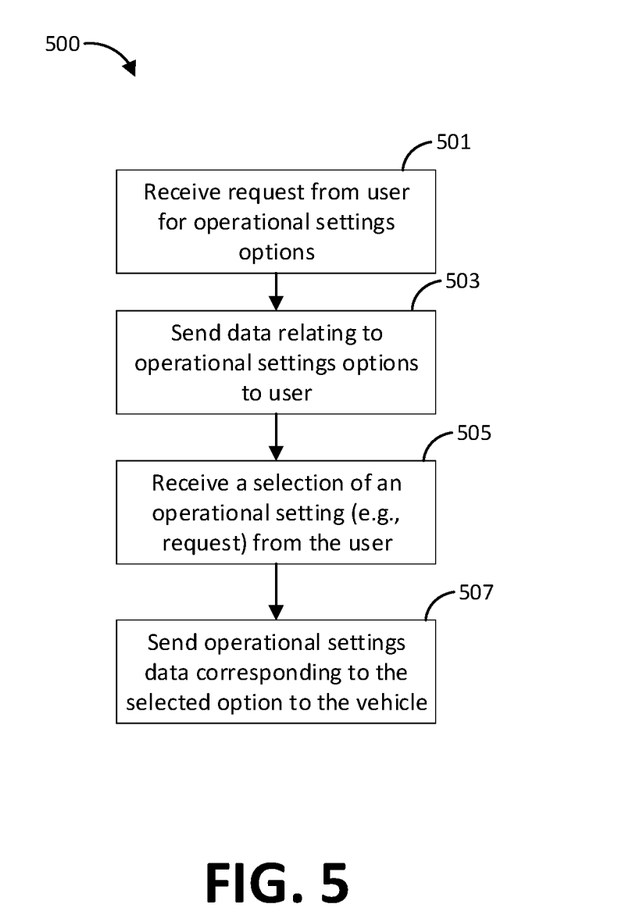

FIG. 5 is a flowchart illustrating an example process 500 for over-the-air provisioning of a vehicle's operational settings. Example process 500, or any portion thereof, may be implemented on a server that may be remote to the vehicle, such as OSS described with reference to FIG. 3. At block 501, the server may receive a request from a user for operational settings options. For example, a user may desire to view all available operational settings available for a vehicle or components of a vehicle. At block 503, the server may send data relating to operational settings options to the user. This may allow a user to view all operational settings that are available. At block 505, the server may receive a selection of an operational setting from the user. For example, the user, after having reviewed available operational settings, may select one or more of the available settings and send a request to the server for said operational setting(s). At block 507, the server may send, to a vehicle, operational settings data corresponding to the option selected by the user. The communications between the user, server and vehicle in example process 500 may be done via a wireless communications path.

Figure 6:
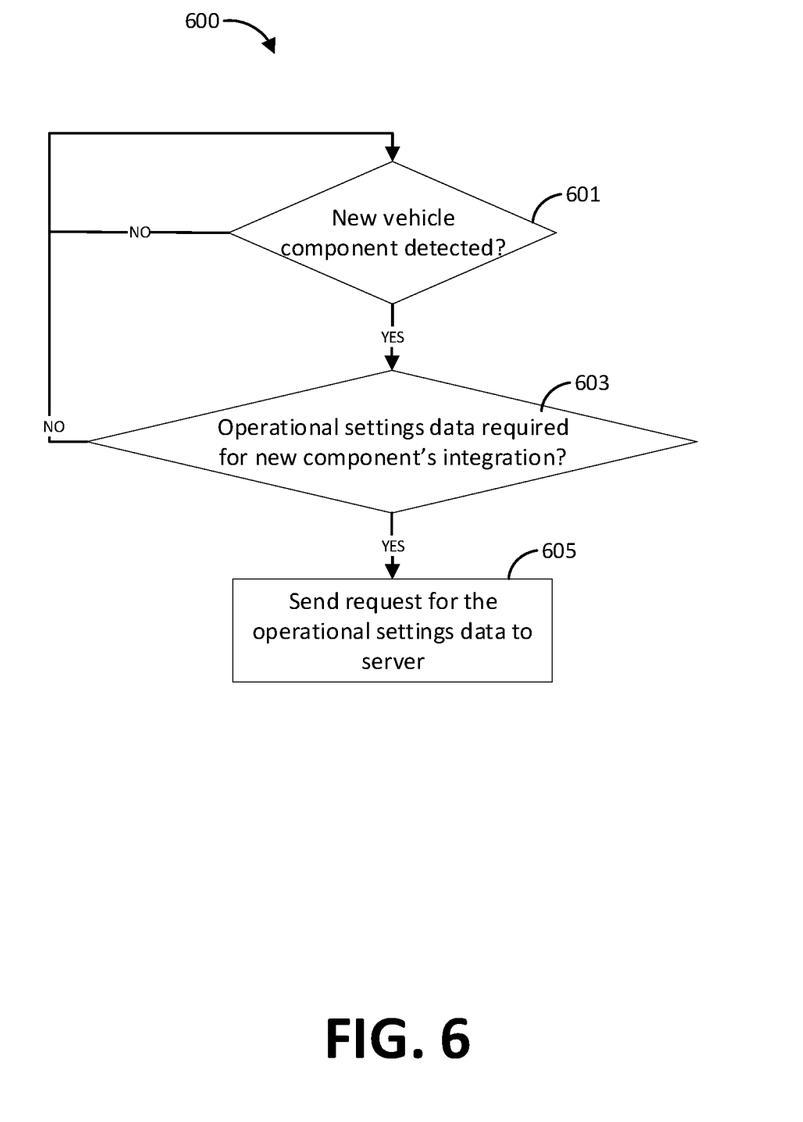

FIG. 6 is a flowchart illustrating an example process 600 for requesting operational settings data from a server. Example process 600, or any portion thereof, may be implemented on a component a vehicle such as example component 200 described with reference to FIG. 2 herein, for example on a processor of the component. In some embodiments, example process 600 can be implemented on a processor of a vehicle management system or a component interface device. At block 601, a processor of vehicle component may check if a new vehicle component has been detected. For example, the processor may detect when a vehicle battery has been replaced with a different vehicle battery (e.g., a new battery of the same type as the old battery or a new battery of a different type than the old battery). As another example, the processor may detect a component that has never before been included in the vehicle, such as a second additional battery, where the vehicle has only ever had one battery, or some other additional energy storage device such as an ultracapacitor. If the processor detects a new component, the processor may proceed to block 603.

At block 603, the processor may determine whether operational settings data is required or desired for the component detected at block 601 to operate properly within the vehicle. For example, the new component or other components of the vehicle may require a more up-to-date version of operational settings and/or new operational settings data for the new component to function properly or optimally with the vehicle and the vehicle's other components. If settings data is not required or desired, the processor may return to block 601 and if settings data is required or desired for the new component or other components, the processor may continue to block 605.

At block 605, the processor may send a request (e.g., to a remote server) for the operational settings data that is required and/or desired. The processor may communicate with the server via a wireless communications path. In response to the request, the remote server may send the operational settings data to the vehicle as described elsewhere herein, for example according to the examples provided. In some embodiments, the operational settings data may be sent to the component of the requesting processor (e.g., vehicle management system, component interface device) and/or to another component such as the new component, for example, if the new component is configured for over-the-air provisioning.

Figure 7:
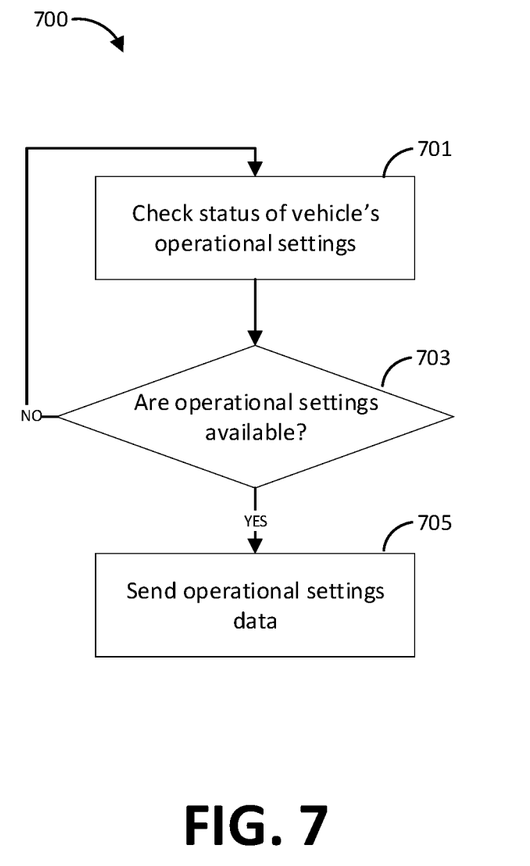

FIG. 7 is a flowchart illustrating an example process 700 for sending operational settings data to a vehicle. Example process 700, or any portion thereof, may be implemented on a server that may be remote to the vehicle, such as OSS described with reference to FIG. 3. At block 701, the server may check the status of a vehicle's operational settings. For example, the server may check which settings data and/or which version of settings data is currently possessed by the vehicle. The server may check the status by querying the vehicle for data relating to its current operational settings (e.g., sending a request to the vehicle for information relating to the operational settings of the vehicle). The server may query the vehicle via a wireless communications path as described elsewhere herein. In some embodiments, the server may keep a history log of download event information and/or have access to such a log such as on a third-party server. The download event information such as recorded in a history log can include one or more of a time of transmitting operational settings data from the server to the vehicle, the operational settings data that have been transmitted from the server to the vehicle, a reason for transmitting operational settings data from the server to the vehicle, the identity of a vehicle sending the request to the server, the identity of a vehicle receiving the operational settings data from the server or the identity of a user sending the request to the server. The history log of download event information may allow the server to know which operational settings the vehicle currently has without having to query the vehicle.

At block 703, the server may determine whether operation settings are available for the vehicle. For example, the server may determine whether a more up-to-date version of the vehicles current operational settings data are available for the vehicle and/or may determine whether new operational settings data are available for the vehicle. The server may compare the vehicle's current operational settings with all operational settings included in the server or accessible by the server or a subset thereof. If the server includes or has access to more or different operational settings than what are currently included in the vehicle, this may indicate that new and/or more up-to-date operational settings are available for the vehicle that may be desirable and/or required for the vehicle or its components to operate (e.g., optimally). If, at block 703, the server determines that operational settings are not available, the server may return to block 701, and otherwise may proceed to block 705.

At block 705, the server may send operational settings data to the vehicle. The operational settings data may include a more up-to-date version of the vehicle's current settings data and/or may include settings data that are new to the vehicle. The server may send the settings data to the vehicle via a wireless communications path as described elsewhere herein.

ADDITIONAL EMBODIMENTS

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof

What is claimed is:

1. A computing system for over-the-air provisioning of a vehicle's operational settings, the computing system comprising:
    a computer readable storage medium having program instructions embodied therewith; and
    one or more processors configured to execute the program instructions to cause the computing system to:
        wirelessly transmit operational settings options to a user remote to the computing system;
        receive, from the user, a selection of one or more of the operational settings options;
        identify operational settings data corresponding to the one or more operational settings options selected by the user, the operational settings data configured to control one or more operations of a vehicle management system of the vehicle to control a transfer of energy from a first energy storage device of the vehicle to a second energy storage device of the vehicle; and
        wirelessly transmit the operational settings data to the vehicle management system of the vehicle remote to the computing system.

2. The system of claim 1, wherein the one or more processors are further configured to execute the program instructions to cause the computing system to:
    wirelessly transmit the operational settings options to the user in response to receiving a request from the user for the operational settings options.

3. The system of claim 1, wherein the one or more processors are further configured to execute the program instructions to cause the computing system to, in response to receiving the request for operational settings data, determine whether operational settings data are available.

4. The system of claim 1, wherein the one or more processors are further configured to execute the program instructions to cause the computing system to, in response to receiving the request for operational settings data, determine a status of operational settings data of the vehicle management system.

5. The system of claim 1, wherein the one or more processors are further configured to execute the program instructions to cause the computing system to maintain a history log including information relating to transmitting operational settings data.

6. The system of claim 1, wherein the first energy storage device comprises a capacitor and wherein the second energy storage device comprises a battery.

7. A method for over-the-air provisioning of a vehicle's operational settings, the method comprising:
    wirelessly transmitting, from a server, operational settings options to a user remote to the server;
    receiving, at the server, a selection of one or more of the operational settings options from the user;
    identifying operational settings data corresponding to the one or more operational settings options selected by the user, the operational settings data configured to control one or more operations of a vehicle management system of the vehicle to control a transfer of energy from a first energy storage device of the vehicle to a second energy storage device of the vehicle; and wirelessly transmitting the operational settings data to the vehicle management system of the vehicle.

8. The method of claim 7, further comprising:

wirelessly transmitting the operational settings options to the user in response to receiving, at the server, a request from the user for the operational settings options.

9. The method of claim 7, further comprising in response to receiving, at the server, the request for operational settings data, determining whether operational settings data are available.

10. The method of claim 7, further comprising in response to receiving, at the server, the request for operational settings data, determining a status of operational settings data of the vehicle management system.

11. The method of claim 10, wherein determining the status of the operational settings data of the vehicle comprises:

querying the vehicle for data relating to its current operational settings data;

determining operational settings data that are accessible to the server and available for the vehicle; and comparing the operational settings data accessible to the server and available for the vehicle with the current operational settings data of the vehicle.

12. The method of claim 10, wherein determining the status of the operational settings data of the vehicle comprises:

accessing a history log to determine the current operational settings data of the vehicle;

determining operational settings data that are accessible to the server and available for the vehicle; and comparing the operational settings data accessible to the server and available for the vehicle with the current operational settings data of the vehicle.

13. The method of claim 7, wherein the first energy storage device comprises a capacitor and wherein the second energy storage device comprises a battery.

14. A vehicle management device for managing over-the-air provisioning of a vehicle's operational settings, the vehicle management device comprising:

a transceiver configured to communicate wirelessly with a remote server to receive operational settings data from the server;

a computer readable storage medium having program instructions embodied therewith; and one or more processors configured to execute program instructions to cause the vehicle management device to:

detect a component of the vehicle;

determine an operational incompatibility of the component;

transmit, via the transceiver, a request for operational settings data to a server remote to the vehicle, wherein the operational settings data are configured to control one or more operations of the vehicle management device relating to an energy management of the vehicle;

receive, via the transceiver and from the server, operational settings data corresponding to the request;

update the program instructions according to the operational settings data; and execute the updated program instructions to cause the vehicle management device to operate according to an operational setting corresponding to the operational settings data received from the server to render the component of the vehicle compatible with the vehicle management device.

15. The device of claim 14, wherein the component of the vehicle comprises one or more of an energy storage device, an energy generation system, a motor, or a component interface device.

16. The device of claim 14, wherein determining an operational incompatibility of the component comprises determining whether the component of the vehicle operates optimally with one or more other components of the vehicle.

17. The device of claim 14, wherein the one or more processors are further configured to execute the program instructions to cause the vehicle management device to determine a status of current operational settings data of the component of the vehicle.

18. The device of claim 14, wherein the one or more processors are further configured to execute the program instructions to cause the vehicle management device to compare current operational settings data of the component with available operational settings data.

19. Non-transitory computer-readable media including computer-executable instructions that, when executed by a computing system, cause the computing system to perform operations comprising:

detecting a component of a vehicle;

determining an operational incompatibility of the component with the vehicle;

transmitting, via a transceiver, a request for operational settings data to a server remote to the vehicle, wherein the operational settings data are configured to control one or more operations of a vehicle management device relating to an energy management of the vehicle;

receiving, via the transceiver and from the server, operational settings data corresponding to the request;

updating program instructions according to the operational settings data; and executing the updated program instructions to cause the vehicle management device to operate according to an operational setting corresponding to the operational settings data received from the server to render the component of the vehicle compatible with the vehicle management device.

20. The non-transitory computer-readable media of claim 19, wherein the component of the vehicle comprises one or more of an energy storage device, an energy generation system, a motor, or a component interface device.

* * * * *